United States Patent [19]
Staller et al.

[11] Patent Number: 5,221,400
[45] Date of Patent: Jun. 22, 1993

[54] METHOD OF MAKING A MICROACCELEROMETER HAVING LOW STRESS BONDS AND MEANS FOR PREVENTING EXCESSIVE Z-AXIS DEFLECTION

[75] Inventors: Steven E. Staller, Kokomo; David W. DeRoo, Carmel, both of Ind.

[73] Assignee: Delco Electronics Corporation, Kokomo, Ind.

[21] Appl. No.: 625,397

[22] Filed: Dec. 11, 1990

[51] Int. Cl.⁵ .............................................. B32B 31/00
[52] U.S. Cl. .................................. 156/292; 73/5.7 R;
   73/5.7 AV; 73/DIG. 1; 156/307.3; 156/329;
   156/630
[58] Field of Search ............ 156/307.3, 292, 329,
   156/630; 528/901; 73/517 R, 517 AV, DIG. 1

[56] References Cited

U.S. PATENT DOCUMENTS

| | | |
|---|---|---|
| 4,901,570 | 2/1990 | Chang et al. |
| 5,060,504 | 10/1991 | White et al. ............... 73/517 R |
| 5,068,203 | 11/1991 | Logsdon et al. |
| 5,121,180 | 6/1992 | Beringhause et al. ........ 73/517 AV |

FOREIGN PATENT DOCUMENTS

| | | |
|---|---|---|
| 0338688 | 10/1989 | European Pat. Off. |
| 0387518A2 | 9/1990 | European Pat. Off. |
| 0395922 | 11/1990 | European Pat. Off. |
| 2158945A | 11/1985 | United Kingdom |

OTHER PUBLICATIONS

H. V. Allen, S. C. Terry, D. W. DeBruin, "Accelerometer Systems With Self-testable Features", *Sensors and Actuators*, vol. 20, Nos. 1,2, pp. 153-161, Lausanne, CH, (15 Nov. 1989).

Primary Examiner—John J. Gallagher
Attorney, Agent, or Firm—Robert J. Wallace

[57] ABSTRACT

A microaccelerometer is provided which has a silicon substrate bonded to a silicon capping plate and silicon back plate, wherein the bonds between the three silicon wafers are characterized by a relatively low residual stress level over a wide temperature range. The bonds are formed by means of an appropriate adhesive at a relatively low temperature without degradation to the microaccelerometer. The bonds between the silicon wafers also provide stress relief during use and packaging of the microaccelerometer. With this invention, the damping distance for the proof mass of the microaccelerometer is accurately controllable and stop means are provided for preventing excessive deflection of the proof mass in a direction perpendicular to the plane of the microaccelerometer.

4 Claims, 1 Drawing Sheet

METHOD OF MAKING A MICROACCELEROMETER HAVING LOW STRESS BONDS AND MEANS FOR PREVENTING EXCESSIVE Z-AXIS DEFLECTION

This invention relates to sensors of the accelerometer type. More particularly, this invention relates to a silicon microaccelerometer having a capping plate and a back plate bonded thereto, wherein the bonds are characterized by relatively low stress and wherein the capping plate and the back plate have means for preventing excessive deflection of the proof mass in a direction perpendicular to the plane of the microaccelerometer.

BACKGROUND OF THE INVENTION

An accelerometer is one of the major sensors used in navigational systems, particularly inertial navigational systems, and on-board automotive safety control systems. Automotive examples of accelerometer use include various anti-lock braking systems, active suspension systems, and seat belt lock-up systems.

Generally, an accelerometer is a device which measures acceleration and, in particular, an accelerometer measures the force that is exerted when a moving body changes velocity. The moving body possesses inertia, which causes the body to resist the change in velocity. It is this resistance to a sudden change in velocity that is the origin of the force which is exerted by the moving body when it is accelerated. This force is proportional to the acceleration component in the direction of the movement, and therefore may be detected by an accelerometer.

In a typical accelerometer, a mass is suspended by two springs attached to opposite sides of the mass. The mass is maintained in a neutral position so long as the system is at rest or is in motion at a constant velocity. When the system undergoes a change in velocity in the direction of the springs' axis or perpendicular to the springs, axis, and therefore is accelerated in a particular direction, the spring mounted mass will at first resist the movement along that axis because of its inertia. This resistance to the movement, or delay in the movement, will force the springs to be temporarily either stretched or compressed. The tensile or compressive force acting on each spring is related to the product of the weight of the mass and the acceleration of the mass. The acceleration is then correspondingly determined by the change in velocity experienced by the mass.

Integrated circuit microaccelerometers having a proof mass suspended by pairs of piezoelectric microbridges are also known. An illustrative example of this type of accelerometer is disclosed in U.S. patent application Ser. No. 07/304,057 to Chang et al entitled "Resonant Bridge Two-Axis Accelerometer". In a microaccelerometer of this type, a proof mass is suspended by at least one pair of piezoelectric microbridges. The pair of microbridges are attached to opposite ends of the proof mass along a common axis. The acceleration of the mass is determined by the change in force acting upon each piezoelectric bridge. This type of resonant microaccelerometer is attractive for precision measurements, because the frequency of a micromechanical resonant structure can be made highly sensitive to physical or chemical signals.

A shortcoming exists with regard to the manufacturing of these and other types of microaccelerometers. The microbridges from which the proof mass is suspended, are typically formed from extremely thin layers of material, generally silicon. These thin microbridges are extremely susceptible to damage if the proof mass is allowed to deflect excessively. Therefore it is desirable that the proof mass be permitted to deflect sufficiently to produce an adequate signal for measurement purposes, but not so much that it causes degradation to the microbridges or other components of the microaccelerometer. A common practice has been to sandwich the silicon wafer having the accelerometer components, between two other wafers of a compatible material, wherein there is a predetermined gap between the proof mass and each of the two surrounding wafers to permit the proof mass to deflect. The gap is in accordance with the design requirements for the sensor and permits the proof mass to deflect that predetermined distance before contacting the surrounding wafer, which prevents it from deflecting any further.

However, there are difficulties associated with the current methods for manufacturing microaccelerometers of this type wherein the device wafer is sandwiched between two wafers of a compatible material. One common method has been to electrostatically bond the silicon microaccelerometer device between two glass plates; each of the glass plates having a recess of appropriate height so as to permit the deflection of the proof mass. However, the mismatch in thermal coefficients of expansion between the silicon wafer and glass wafers causes thermally induced stresses over the wide temperature range which the microaccelerometer must satisfactorily operate. This is particularly true if the microaccelerometer is within an automobile environment. Also, glass is inherently difficult to machine, which is necessary for formation of the required recesses so as to permit deflection of the proof mass. For these reasons, this current practice of bonding the silicon microaccelerometer wafer between two glass plates is unacceptable.

An alternative method for forming the microaccelerometer has been to sandwich the silicon device between two silicon wafers, again each of the surrounding silicon wafers having an appropriately provided recess for deflection of the proof mass. The silicon wafers are then bonded together using conventional gold eutectic bonding techniques. However, this method, although it alleviates the problem of mismatched thermal coefficients, is also problematic. In order to initiate the formation of the eutectic bond, the wafer surfaces must be aggressively scrubbed together to ensure intimate contact between the surfaces. This is unacceptable once the microaccelerometer components have been formed on the intermediate silicon wafer, since this aggressive action is detrimental to the device components. Yet it is only after the components have been formed that the surrounding wafers can be bonded to the microaccelerometer, thereby making this method also unacceptable.

Therefore, what is needed is an accelerometer which avoids these shortcomings of the prior art. It would be desirable to provide a microaccelerometer wherein the bonds between the accelerometer and surrounding wafers are characterized by a relatively low stress level which do not result in unnecessary residual stress to the device. Further, it is desirable that such a microaccelerometer have means for facilitating accurate and precise control of the spacing between the bonded wafers, while also preferably incorporating stop means into its design to prevent excessive deflection of the proof mass. Lastly, it is preferable that such bonds within such an accelerometer be formed without degradation to those components, such as by forming at a relatively low temperature without any aggressive scrubbing type action.

SUMMARY OF THE INVENTION

It is therefore an object of this invention to provide a microaccelerometer, wherein the bonds between the silicon device wafer and a capping plate and a back plate are characterized by a relatively low residual stress level.

It is a further object of this invention to provide such a microaccelerometer having such bonds, wherein the spacing between the bonded wafers can be accurately controlled while also providing stop means for limiting the z-directional deflection of the proof mass of such an accelerometer.

Lastly, it is a still further object of this invention that such bonds be formed after the microaccelerometer components have been made without degradation to those components.

In accordance with a preferred embodiment of this invention, these and other objects and advantages are accomplished as follows.

An accelerometer is provided which is suitable for accurately determining the acceleration of a proof mass in a plane perpendicular to the plane of the microaccelerometer.

The accelerometer primarily consists of a silicon substrate oriented essentially along a single crystallographic plane. The single crystal silicon substrate has a front and a back surface which are substantially parallel to each other. A proof mass is formed within the silicon substrate whereby the proof mass is suspended from microbridges within the silicon substrate. Therefore, a gap is provided substantially everywhere therebetween the substrate and the proof mass except at the microbridges.

Electronic means for detecting a change in the acceleration of the mass are provided essentially on the front surface of the silicon substrate and proof mass. These means for detection provide an indication of acceleration in the plane of the proof mass by detecting the change in movement by the proof mass.

An inventive feature of this invention is that the microaccelerometer is bonded near its perimeter, to a silicon capping plate and a silicon back plate so as to prevent excessive displacement of the proof mass in a direction perpendicular to the plane of the proof mass, i.e., a z-axis direction. The bonds between the three silicon plates are characterized by relatively low stress and also provide a means for accurately controlling the spacing between the microaccelerometer and these surrounding plates.

Both the silicon capping plate and silicon back plate are machined to have a support column of a predetermined height provided continuously around the region adjacent their outer perimeter where they are bonded to the silicon substrate having the microaccelerometer. The capping plate is bonded to the front surface of the microaccelerometer and the back plate is bonded to the backside of the microaccelerometer near their respective support columns. The plates are bonded together by providing an appropriate adhesive at the outer perimeter of the wafers. The adhesive bonds are characterized by low residual stress, even over a wide temperature range and can be formed at a relatively low temperature without unnecessary degradation to the microaccelerometer components. In addition, the adhesive bonds provide some isolation for the microaccelerometer from stresses arising from vibration during use or packaging.

The support columns form a recessed area within each of the plates. The recessed area has a diameter determined by the location of the support column and a depth equal to the height of the support column. The recessed areas are provided so that the proof mass of the accelerometer can deflect within these recessed areas. Therefore the predetermined height of the support columns is chosen to optimize design specifications for the microaccelerometer, and can be accurately controlled.

Within the recessed region of each plate, at least one stop means is also provided to prevent excessive deflection of the proof mass in a direction perpendicular to the front and back surfaces of the microaccelerometer. The stop means on each plate is preferably a second machined column of a second predetermined height which is less than the first predetermined height of the support column.

Other objects and advantages of this invention will be better appreciated from a detailed description thereof, which follows.

BRIEF DESCRIPTION OF THE DRAWINGS

The advantages of this invention will become more apparent from the following description taken in conjunction with the accompanying drawings wherein like references refer to like parts and wherein.

DETAILED DESCRIPTION OF THE INVENTION

Figure 1:
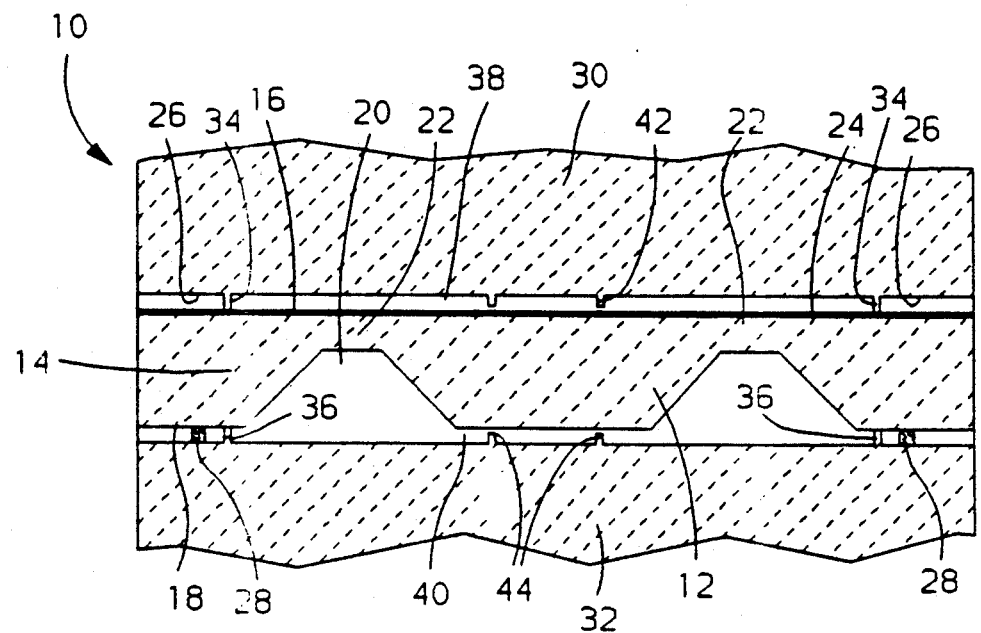
FIG. 1 is a cross sectional view of a microaccelerometer in accordance with a preferred embodiment of this invention, which is bonded to a capping plate and a back plate wherein both the capping plate and the back plate have stop means provided for preventing excessive deflection of the proof mass within the microaccelerometer.

As shown in FIG. 1, an accelerometer 10 is provided which is suitable for accurately determining the acceleration of a proof mass 12 in a direction perpendicular to the plane of the microaccelerometer 10.

The microaccelerometer 10 is formed from a silicon substrate 14 oriented essentially along a single crystallographic plane. It is preferred that the silicon substrate 14 be a single crystal oriented along the <100> crystallographic plane for optimal micromachining results, however suitable results are also obtained when the silicon substrate 14 is oriented along the <110> crystallographic plane.

The single crystal silicon substrate 14 has a front and a back surface, 16 and 18 respectively, which are substantially parallel to each other. A proof mass 12 which is suspended within the silicon substrate 14 by microbridges 22, is formed using known micromachining techniques, such as disclosed in U.S. Ser. No. 07/577,656 to Logsdon et al, filed Sept. 4, 1990 and entitled "Method for Forming Thin Silicon Membrane or Beam". Alternative conventional methods for micromachining the silicon substrate 14 may also be used to form the proof mass 12 and microbridges 22. The proof mass 12 is suspended from the silicon substrate 14 with a gap 20 provided substantially everywhere therebetween the substrate 14 and the proof mass 12 except where the microbridges 22 are provided.

Electronic means for detecting a change in the acceleration of the proof mass 12 are provided essentially on the front surface 16 of the silicon substrate 14, including the proof mass 12 and the microbridges 22. These electronic means are depicted by the cross-hatched region 24 and do not constitute an inventive feature of this invention. The electronic means 24 for detection provide an indication of acceleration in the plane of the proof mass 12 by detecting the change in movement by the proof mass 12 and may be accomplished by several known methods.

Generally, the microaccelerometer 10 measures the components of acceleration in the plane of the silicon substrate 14 by the following technique. Preferably, the silicon microaccelerometer 10 contains two pairs of microbridges which are orthogonally attached to the silicon proof mass 12, so as to be positioned along the x- and y-axis of plane of the microaccelerometer. (Only one pair of microbridges 22 is shown in the cross sectional view, the second pair of microbridges would be orthogonal to the first pair 22.) In order to cancel temperature and material effects to the first order, the microbridges 22 which are attached to opposite sides of the proof mass 12 should be matched, so that they experience differential axial loads during acceleration. The inertial force on the proof mass 12, due to acceleration in the plane of the substrate 14, generates the differential axial loads on the opposing microbridges 22 of each pair, thereby causing a corresponding change in the piezoresistors formed in each microbridge 22.

An inventive feature of this invention is that the microaccelerometer 10 is bonded near its perimeter 26 and 28 to a silicon capping plate 30 and a silicon back plate 32 respectively. The purpose of the capping plate 30 and back plate 32 is to protect the microaccelerometer detection means 24 and proof mass 12 during use, and to prevent excessive displacement of the proof mass 12 in a direction perpendicular to the plane of the proof mass 12 and substrate 14, i.e., the z-axis. The bonds 26 and 28 between the silicon substrate 14 and the two plates 30 and 32 are characterized by relatively low stress, and also provide a means for accurately controlling the spacing in which the proof mass 12 deflects between the microaccelerometer 10 and these two plates 30 and 32.

Both the silicon capping plate 30 and silicon back plate 32 are machined to have a support column, 34 and 36 respectively, of a predetermined height provided continuously around the region adjacent their outer perimeters (which region corresponds to an outer periphery surrounding said mass and said means for detecting change in acceleration) where they are bonded, at 26 and 28 respectively, to the microaccelerometer 10. The support columns 34 and 36 are machined out of the silicon substrate 14 using conventional patterning and etching techniques. The height of the support columns 34 and 36 is determined by the particular application and the processing parameters required to form the columns. The height of the support columns 34 and 36 essentially determines the height of the gap between the proof mass 12 and each plate 30 and 32, and correspondingly the amount of deflection or damping distance for the proof mass 12. This damping distance is critical to the microaccelerometer 10 performance and can be accurately controlled by the height of the support columns 34 and 36. This is a particularly advantageous feature of this invention. The support columns 34 and 36 do not have to be the same height, although it is foreseeable that in most applications they would be.

The capping plate 30 is bonded to the front surface 16 of the microaccelerometer 10 and the back plate 32 is bonded to the backside 18 of the microaccelerometer 10 at a region 26 and 28 adjacent to their respective support columns 34 and 36 respectively. It is preferred that the bonded regions 26 and 28 are adjacent to the support columns 34 and 36 to ensure intimate contact between the mating surfaces of the support columns 34 and 36 and the silicon substrate 14.

Figure 2:
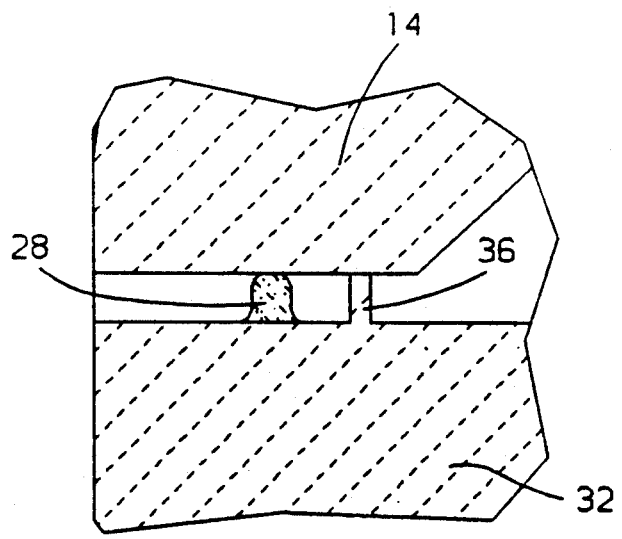
FIG. 2 is an enlarged view of an illustrative bonding region within the microaccelerometer showing both a support column and adhesive.

The silicon substrate 14 and the capping and back plates 30 and 32 are bonded together by providing an appropriate adhesive at that region 26 and 28 adjacent the support columns 34 and 36 near the outer perimeter of each silicon wafer 14, 30 and 32. To ensure thorough bonding between the plates 14, 30 and 32, the adhesive should be provided continuously around the perimeters of the capping plate 30 and back plate 32. As an illustrative example, shown in FIG. 2, the back plate 32 is bonded to the silicon substrate 14 by applying the adhesive at that region 28 adjacent to the support column 36 of the back plate 32. The adhesive may be conventionally screen-printed onto the substrate, or other suitable alternative methods for depositing the adhesive may also be used.

It is preferred that the adhesive be a silicone rubber such as an RTV type of adhesive A particularly suitable type of RTV adhesive is commercially available from Dow Chemical under the product code Q36611. Other suitable RTV adhesives may also be used, as well as other types of adhesives. After applying the adhesive, the silicon substrate 14 and silicon plates 30 and 32 are bonded together by stacking the plates 14, 30 and 32 as shown in FIG. 1 and applying an appropriate weight to the stack of plates 14, 30 and 32 during the curing process for the adhesive. The weight is not necessary however it ensures intimate and thorough contact between the plates 14, 30 and 32 during the curing process.

The curing process for the adhesive is carried out at a relatively low temperature which is another advantage of this invention. The low temperature does not cause any significant damage to the microaccelerometer 10 or its electrical components (depicted by region 24) during bonding, even though the plates 14, 30 and 32 must be bonded together after the electrical components 24 are formed. For the preferred adhesive, Dow Chemical's Q36611 RTV adhesive, a curing temperature of about 150° C. for about 3 to 4 hours is used. In addition, this invention permits facile assembly of the accelerometer 10 without the need for aggressively scrubbing the plates 14, 30 and 32 together to promote the bond, as in the prior art.

The adhesive bonds 26 and 28 within the microaccelerometer 10 are characterized by low residual stress, even over a wide temperature range. Even after curing, the adhesive bonds 26 and 28 remain somewhat pliable, thereby providing a degree of stress isolation for the microaccelerometer 10 during use and packaging. In addition, because the silicon substrate 10 is the same material as the capping plate 30 and back plate 32, thermally induced stresses due to mismatched thermal coefficients of expansion are essentially nonexistent. Bonding the microaccelerometer 10 components in this manner results in a device having very little residual stress which yields superb device performance over a wide temperature range.

It is to be noted that the support columns 34 and 36 form a recessed region 38 and 40 respectively within each of the silicon plates 30 and 32. The recessed regions 38 and 40 have a diameter determined by the location of the corresponding support column 34 and 36, and a depth equal to the height of the support column 34 and 36. The recessed regions 38 and 40 are provided so that the proof mass 12 of the accelerometer 10 can deflect in the z-axis direction which is perpendicular to the front and back surfaces 16 and 18 of the microaccelerometer 10. Within the recessed region 38 and 40 of each plate 30 and 32, at least one stop means, 42 and 44 respectively, is also provided to prevent excessive deflection of the proof mass 12. The stop means 42 and 44 on each plate 30 and 32 is preferably a second machined column of predetermined height which is less than the first predetermined height of the support columns 34 and 36. The stop means columns 42 and 44 are machined using conventional patterning and etching techniques for silicon, and can be formed concurrently with the support columns 34 and 36.

The height of the stop means columns 42 and 44 may vary, but it is always less than the height of the support columns 34 and 36, so as to permit some deflection by the proof mass 12. The difference between the height of the stop means columns 42 and 44, and the support columns 34 and 36 (and correspondingly the damping distance for deflection by the proof mass 12) depends on the particular application. For a microaccelerometer detecting low accelerations, the difference in heights between the columns should be small, or correspondingly the amount of deflection by the proof mass 12 is small. Conversely, for applications where the microaccelerometer 10 will be detecting greater accelerations, the difference between the heights of the support columns 34 and 36 and the stop means columns 42 and 44, needs to be larger to permit greater movement of the proof mass 12. As is obvious, the stop means columns 42 and 44 permit sufficient movement of the proof mass 12 yet protect the proof mass 12 from excessive deflection. In a particular application, of a microaccelerometer 10 which is designed to measure up to about 25 g's of acceleration, the difference between the height of the support columns 34 and 36 and the stop means columns 42 and 44 is about 5 micrometers. Therefore, the proof mass 12 is allowed to deflect 5 micrometers in either direction before contacting the stop means 42 provided on the capping plate 30 or the stop means 44 provided on the back plate 32.

It should be noted that the height of the stop means 42 and 44 provided on the capping plate 30 and the back plate 32 respectively, do not need to be equal, however it is foreseeable that they always would be approximately equal. In addition, the number of stop means columns 42 and 44 on each plate 30 and 32 may vary depending on the application and the processing techniques used. It is desirable that the stop means 42 and 44 which are provided on each plate 30 and 32 are symmetric about the center of the plate 30 and 32, so as to ensure equal and even distribution of the stopping action to the proof mass 12.

With this invention, a microaccelerometer which has plate-to-plate bonds characterized by low residual stress is provided. The microaccelerometer exhibits good device performance over a wide temperature range, accurate spacing for deflection of the proof mass, and means for preventing excessive deflection of the proof mass.

Although this invention discloses a preferred method for forming such a microaccelerometer having these attributes, it is to be understood that various modifications and changes may be made in the processing parameters, use and construction without departing from the spirit of the invention, such as by varying the type of adhesive used, or by providing the adhesive at a region adjacent to the support columns but inside the recessed region of each plate, or by modifying the processing parameters and materials within the scope of the art. For this reason, these variations are properly considered within the scope of this invention and accordingly the scope of our invention is to be limited only by the following claims.

The embodiments of the invention in which an exclusive property or privilege is claimed are defined as follows:

1. A method for forming an accelerometer comprising the following steps:
   providing a silicon substrate oriented essentially along a single crystallographic plane having a front surface and a back surface which are substantially parallel to each other;
   suspending a proof mass by microbridges within said silicon substrate such that a gap is provided substantially everywhere therebetween except where the microbridges are provided;
   providing means for detecting a change in the acceleration of said mass so as to provide an indication of acceleration of said mass, said means for detecting being provided essentially on said front surface of said silicon substrate;
   providing a silicon capping plate having a support column of a first predetermined height provided continuously around a region adjacent an outer perimeter of said silicon capping plate, which region corresponds to an outer periphery surrounding said mass and said means for detecting change in acceleration and having at least one stop means of a second predetermined height which is less than said first predetermined height provided on said silicon capping plate within said outer perimeter;
   providing a silicon back plate having a support column of a third predetermined height provided continuously around a region adjacent an outer perimeter of said silicon back plate, which region corresponds to an outer periphery surrounding said mass and said means for detecting change in acceleration and having at least one stop means of a fourth predetermined height which is less than said third predetermined height provided on said silicon back plate within said outer perimeter; and
   bonding at said outer perimeter region said silicon capping plate to said front surface of said silicon substrate and said silicon back plate to said back surface of said silicon substrate using a silicone based adhesive, such that a gap of approximately said first and third predetermined heights exists between said silicon substrate and said silicon capping and back plates respectively.

2. A method for forming an accelerometer as recited in claim 1 wherein said first and third predetermined heights are substantially equal, and said second and fourth predetermined heights are substantially equal.

3. A method for forming an accelerometer as recited in claim 2 wherein said first predetermined height is greater than said second predetermined height by not more than about five micrometers.

4. A method for forming an accelerometer as recited in claim 1 further comprising the step of:
   curing said silicone based adhesive at a temperature of approximately 150° C. for up to about four hours.

* * * * *